April 26, 1955
O. S. WILLIAMS
TRACTOR COVERS
2,707,031
Filed June 15, 1951
3 Sheets-Sheet 1
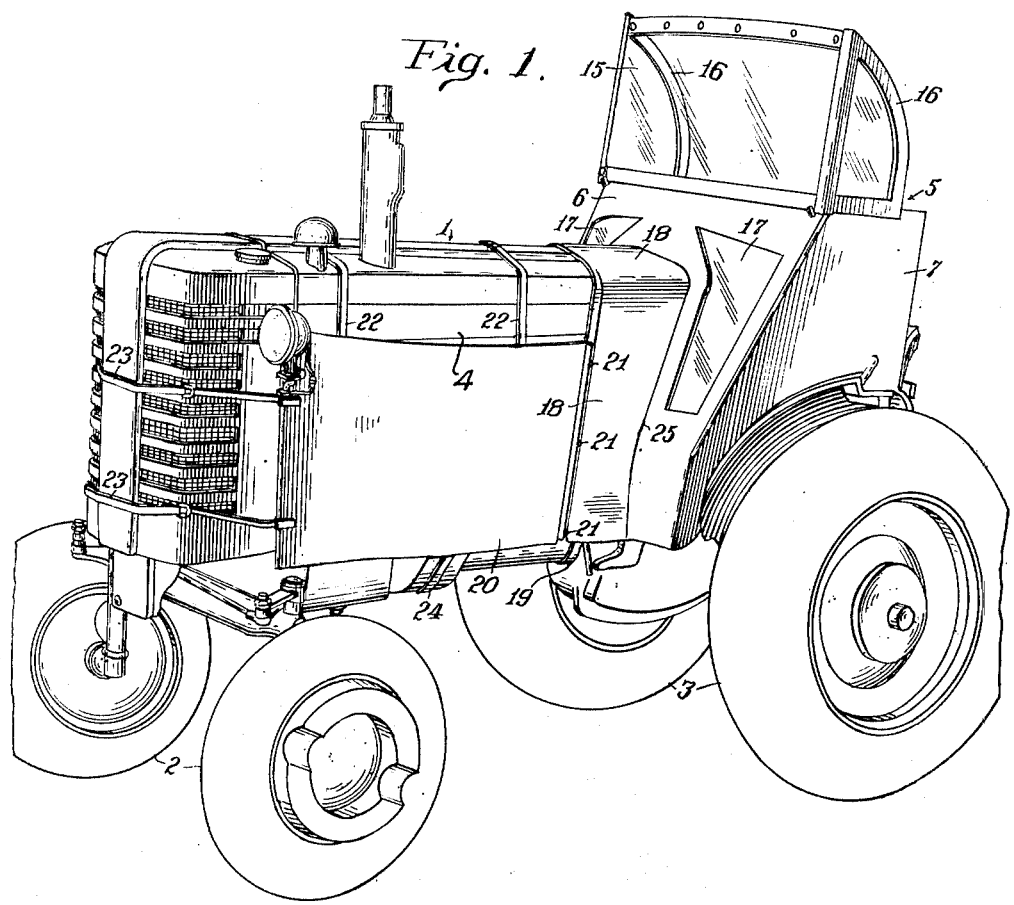
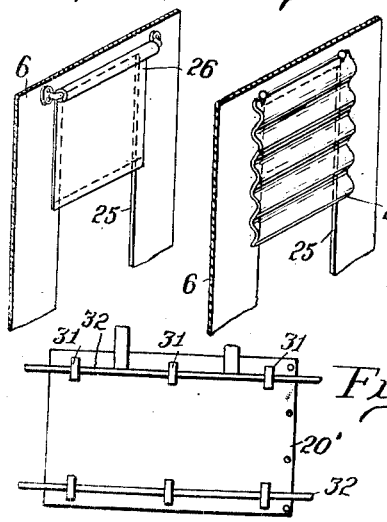
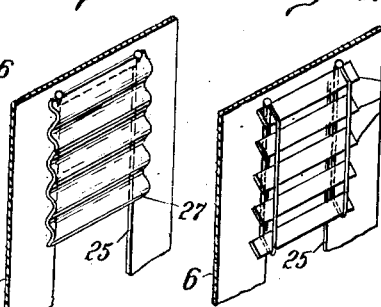
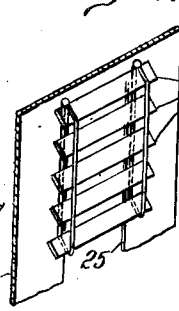
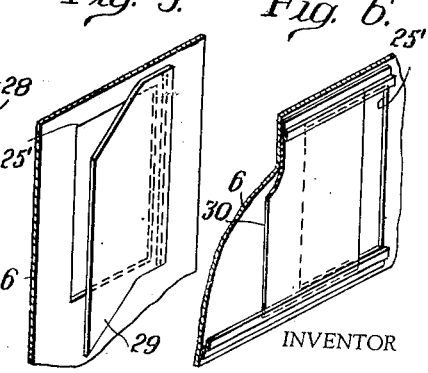
INVENTOR
Oscar Stanley Williams
BY
ATTORNEY

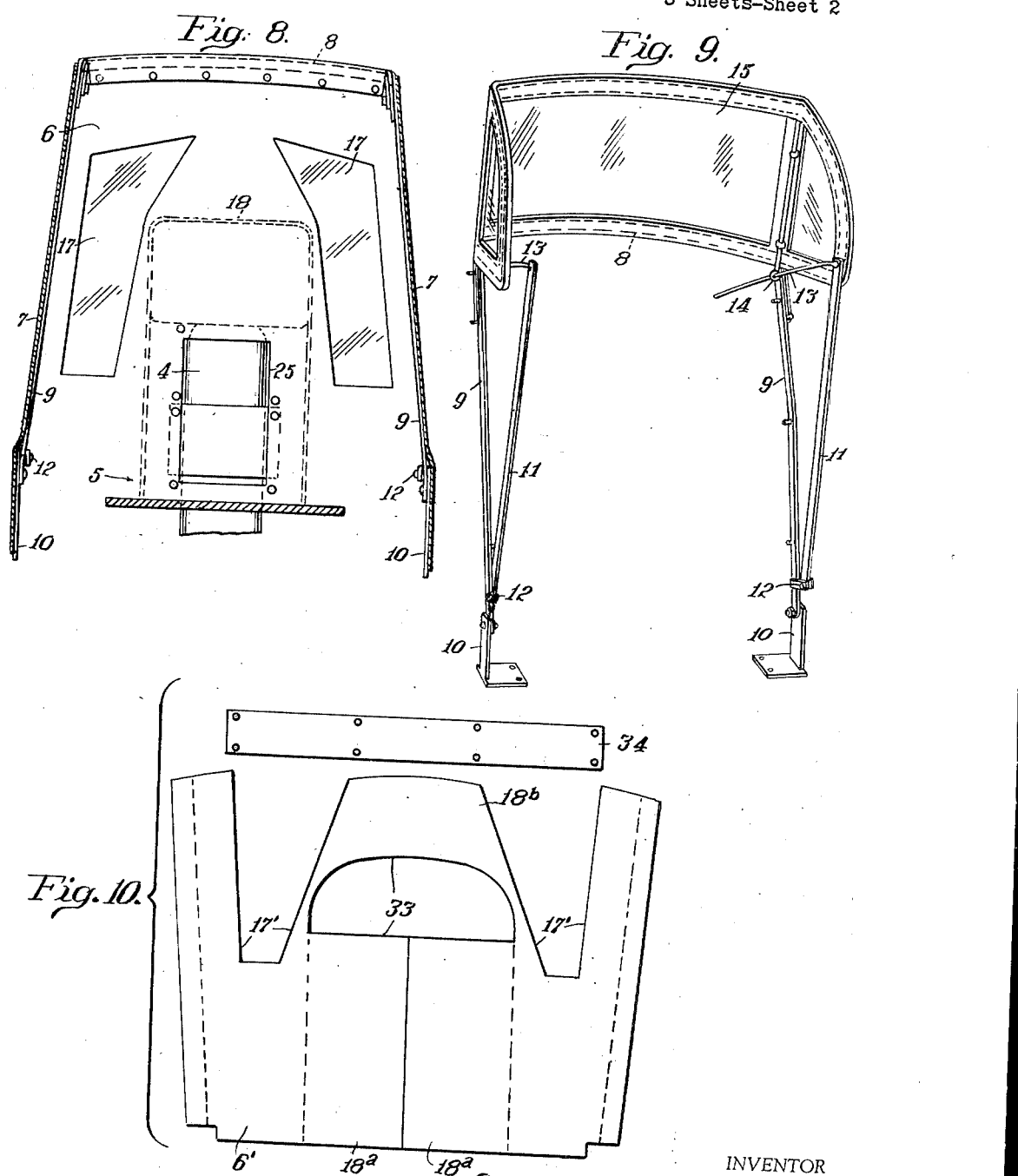

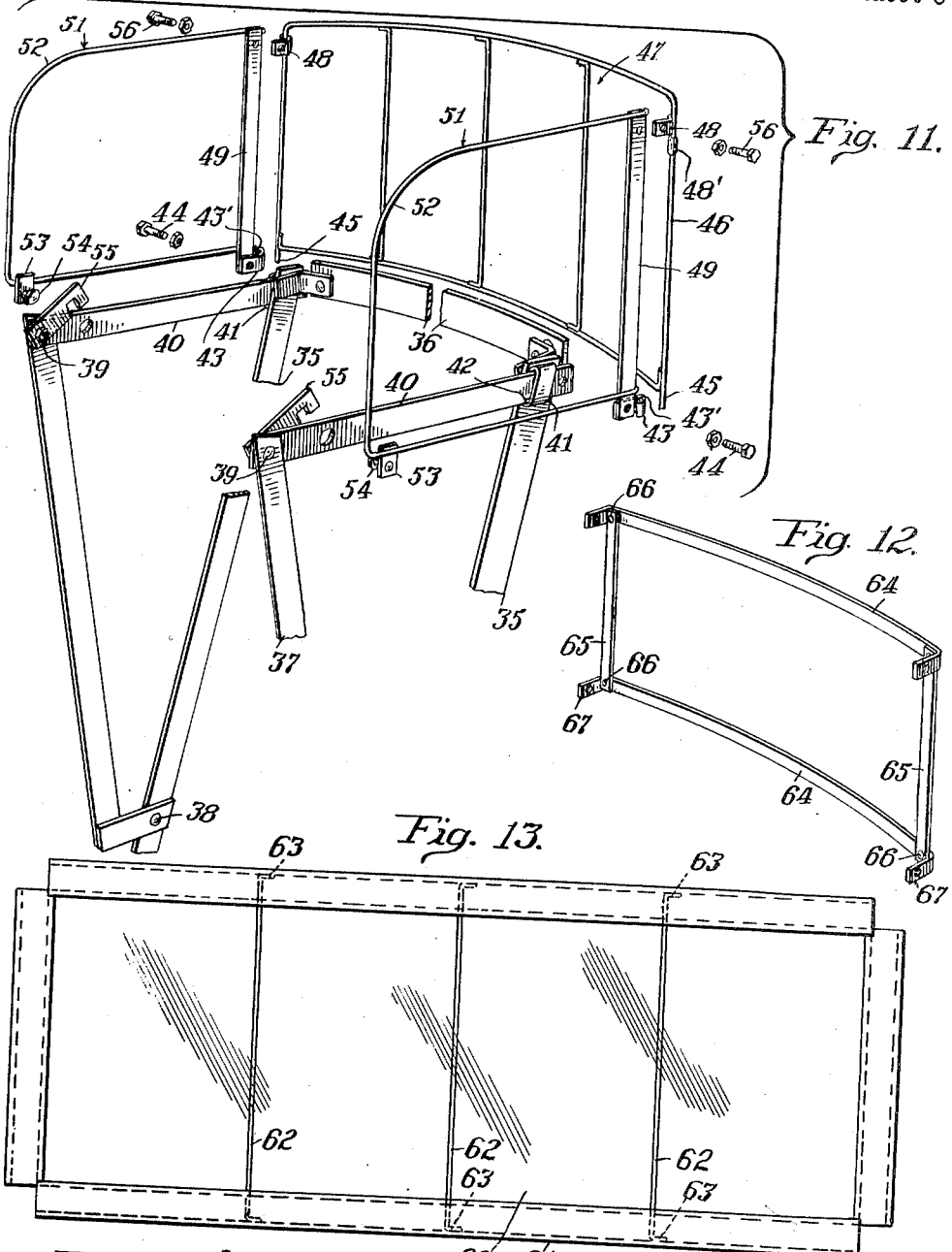

United States Patent Office 2,707,031
Patented Apr. 26, 1955

2,707,031

TRACTOR COVERS

Oscar Stanley Williams, Arlington, Ind.

Application June 15, 1951, Serial No. 231,710

8 Claims. (Cl. 180—54)

This application is a continuation in part of my prior application for tractor cabs, Ser. No. 139,610, filed January 10, 1950.

This application relates to improvements in tractor covers of a character adapted to be applied to farm tractors, industrial and other tractors, and machines for like purposes, to provide a shelter and enclosure for the operator as protection from the weather, either partly or entirely, during the operation of the tractor or other device to which the invention may be applied.

It has been customary heretofore to provide partial protection for the operator of a tractor by means of a tractor cover, usually made of canvas, and fitted over the front portion of the operator's compartment, often with flaps along the sides of the engine in position to direct heat from the engine back into the space occupied by the operator. Most tractor covers that have been so manufactured have been objectionable because of the poor visibility immediately in front of the rear tractor wheels and alongside the tractor engine at ground level. Vision is needed in that area, particularly when operating implements by the tractor, and for the purpose of observing row crops along which the tractor is operating. Usually the tractor cover is made high enough for protecting the operator but it serves thereby to obstruct the view at the points mentioned.

One object of this invention is to improve the construction of tractor covers by providing for windows therein at either side of the engine, preferably at a right angle to the line of vision of the operator, in positions whereby the operator may observe the area of the ground on opposite sides of the engine and immediately in front of the rear wheels, so as to observe particularly implements located in such region, as well as row crops along which the tractor may be operating.

With conventional tractor covers generally manufactured heretofore, it has been customary to provide side flaps which substantially close the areas of the tractor at opposite sides of the engine so that the air blown backward by the fan of the engine along the sides of the engine is heated. With tractors so made as to have a substantial opening between the engine and the region of the operator's compartment, a substantial amount of heat is directed to the operator, often more than is desired. It has been customary under such circumstances either to remove entirely the side flaps, where that is permissible, or to drape these back over the engine. The latter is particularly objectionable, and often, when the side flaps are removable, the remainder of the tractor cover is held insecure.

Another object of this invention is to provide for the adjustment of the heat supplied to the operator through adjustable louvers, vents, or other means, located either in the cowl section of the tractor cover or in the side flaps, or an adjustment of the side flaps themselves, whereby an adequate variation of the quantity of air supplied to the operator may be made whenever desired.

Still another objection to conventional tractor covers has been the large amount of canvas usually required in covering the desired portion of the tractor. This has been necessary due to the wide spacing of the lateral sides of the cover at the operator's compartment, while the portion of the cover that embraces the engine has been comparatively small. Generally the canvas has been drawn along tapered lines from the cab portion at the operator's compartment to opposite sides of the engine.

Still another object of this invention is to simplify and improve the construction of the tractor cover, as well as to conserve the quantity of canvas required by constructing the enclosure for the operator's compartment separately from the enclosure for the engine, and including therein a cowl portion or wall that extends upwardly at the front of the operator's enclosure, and which, in turn, is intersected by a section that encloses a part of the engine. In this way the amount of canvas required is reduced appreciably, while yet providing other advantages and improvements.

These objects may be accomplished according to one embodiment of the invention by providing an operator's enclosure formed of canvas, or other suitable material, supported on a frame that is detachably mounted on a suitable portion of the tractor. The operator's enclosure includes a front wall or cowl section which is intersected by an engine cover section that is preferably secured thereto and is adapted to extend over the rear portion of the power unit including the engine. It is preferred also that side flaps be provided adapted to extend along opposite sides of the engine.

The cowl section or wall preferably is formed with windows of suitable sizes and disposition to afford visibility to the operator from the operator's seat to the region of the tractor directly at opposite sides of the engine in front of the rear wheels. An opening is also provided in the cowl wall between the engine and the operator's enclosure for the passage of heat back into the operator's enclosure. Provision is made here for adjustment of the quantity of heat to be delivered to the operator's enclosure by means of adjustable louvers, flaps, etc., or for adjusting the side flaps to vary the quantity of heat as desired.

This invention is illustrated in certain embodiments in the accompanying drawings, in which:

Fig. 1 is a perspective view of a tractor showing one form of improved tractor cover thereon;

Figs. 2 to 6 are views in perspective of adjustable louvers, vents, etc. for controlling the quantity of heat delivered by the engine;

Fig. 7 is a view in side elevation of an adjustment for the side flaps;

Fig. 8 is a cross section through the operator's compartment, with the wind-shield and most of the tractor structure removed;

Fig. 9 is a perspective view of the supporting frame and wind-shield;

Fig. 10 is a plan view of a blank from which parts of the enclosure are formed;

Fig. 11 is a perspective view of the windshield and supporting frame, detached, and of a modified construction;

Fig. 12 is a perspective view of a further modified form of windshield frame;

Fig. 13 is an elevation of a windshield cover, separate from the frame; and

Fig. 14 is a detailed side elevation showing a frame connection.

The invention is generally applied to a conventional farm tractor, although it is recognized that it is applicable to any suitable farm, industrial or other type of tractor, or self-propelled motor vehicle of which the operator would be exposed to the elements during the operation thereof.

The tractor is designated generally by the numeral 1 and is provided with the usual front and rear wheels 2 and 3, respectively, and with an engine generally designated at 4, for propelling the rear wheels. An operator's compartment is provided at the back, generally designated at 5, within which the conventional seat is located for controlling the operation of the tractor.

An enclosure is provided for the operator, including a front wall or cowl section 6 and opposite side walls 7, preferably formed of canvas or other suitable fabric, or other material, and of one piece or multiple sections, as desired. This operator's enclosure is supported by a frame including a cross bow or bar 8, with downturned opposite sides 9, as shown in Fig. 9, usually formed of a metallic strip. The lower ends of the frame 8—9 are anchored to suitable parts of the tractor, as by means of brackets, generally designated at 10 in Fig. 9, which may be secured to the rear axle housings, floor, or other frame parts of the tractor according to the structure of the latter and the preferred method of attaching the tractor cover thereto. In order to maintain the side sections in stretched condition, arms 11 are pivotally connected at 12 with the side members 9, and extend upwardly therefrom substantially in V-shape. The upper ends of the arms 11 have rods 13 anchored thereto, and extending through loops 14 on the side members 9 to limit the opening of the members 9 and 11 with respect to each other.

The frame 8 may be used to support a wind-shield, if desired, as indicated generally at 15, which in the form illustrated has side wings 16 thereon, although the wind-shield is not required and may be omitted if desired. Usually the wind-shield is detachable from the frame, and may be omitted as shown in Fig. 8.

The front wall 6 or cowl section preferably extends transversely of the tractor substantially in an upright direction. This front wall or cowl section 6 has sufficient lateral and vertical extent to provide for windows 17 therein that may be formed of transparent plastic or other suitable material. Such windows 17 allow visibility of the operator downwardly to the area on opposite sides of the engine in front of the rear wheels, which would not be possible otherwise when the operator is seated. This is a substantial advantage in tractors of this character.

Extending directly forward from the cowl section or front wall 6 is an engine cover section 18 that embraces the opposite sides and top of the engine generally designated 4 in Fig. 1, which engine structure usually includes both the engine and fuel tank. The section 18 extends downward on opposite sides of the fuel tank and engine to a point adjacent the bottom end of the latter, and may be anchored in place in any suitable manner, as by means of a connecting strap 19 extending transversely beneath the engine and attached at its opposite ends to the lower edges of the section 18.

Attached to the forward edges of the enclosing section 18 are side flaps generally designated at 20 which may be made separate from the section 18, or in one integral piece therewith. If made separate, these side flaps 20 may be attached by suitable fastenings, such as are indicated at 21 in Fig. 1, to the forward edges of the section 18. The side flaps 20 extend along opposite sides of the engine to the desired extent and are shown as terminating adjacent the radiator of the tractor. These flaps 20 are held in place by straps 22 that extend over the top of the engine, straps 23 that extend around the front of the radiator, and one or more straps 24 that extend downward beneath the engine. Any suitable attachment or tightening means may be provided for these respective straps.

This tractor cover as thus applied usually leaves a space between the side flaps 20 and the adjacent sides of the engine 4, so that air may be blown back over the engine by the fan of the tractor and a substantial amount of air, thus heated by the engine, will find its way into the operator's enclosure 6—7. An opening may be provided through the cowl section or wall 6 as indicated generally at 25 in Figs. 2 to 6, which opening may extend entirely to the lower edge of the wall or only part way as indicated at 25' in Figs. 5 and 6. Any suitable means may be used to provide an adjustable closure for the opening 25 or 25'. A flap 26' is shown in Fig. 8 extending over a part of the opening 25 and adjustable with respect thereto, as by snap fasteners, to vary the quantity of air admitted through the opening.

Different forms of shutters or closures are shown in Figs. 2 to 6, which may be moved to different extents over the opening for partly or entirely closing the latter in order to reduce the quantity of heat directed in the operator's enclosure. A roller curtain is shown in Fig. 2 and designated 26. An adjustable blind device with slats is shown in Fig. 4 and designated 28. A flap is shown in Fig. 5 and designated 29. A slidable curtain or door is shown in Fig. 6 and designated 30.

If preferred, in place of providing the adjustment for the opening 25 or 25', an adjustment may be provided for the side flaps 20, as shown in Fig. 7, to permit the latter to be moved to partially open positions with respect to the engine. In this form the flaps are shown at 20', having loops on the inner surfaces thereof indicated at 31, slidably mounted upon guide members 32 to permit the longitudinal gathering of the flaps to constrict the length thereof. The guide members 32 may extend around the front of the radiator in the manner of the straps 23 and backward along opposite sides of the engine to be anchored to proper portions of the tractor.

I have shown in Fig. 10 a plan for the cowl section or front wall 6, to enable this to be made with a minimum waste of canvas by providing openings for the windows 17. The body portion is designated at 6' and has a cut-out 33 to form the opening for receiving the back end of the engine and fuel tank as well as cut-outs 17' to receive the covering material for the windows 17. Flaps are shown at 18a, adapted to be turned forward to form the sides of the enclosure 18, while a portion 18b forms the top portion thereof. A separate strip indicated at 34 is attached to the other parts to form the upper edge portion of the front wall or cowl section 6. These parts are stitched together and form a unitary enclosure for this part of the tractor.

A modified form of frame structure is shown in Fig. 11 in which side frame bars 35 correspond with the bars 9 and support at their upper ends a crossbow or bar 36 which supports the front wall or cowl section 6, adjacent its upper edge, as described above.

Each of the side frame members 35 has an arm 37 pivotally connected therewith at 38, corresponding generally with the member 11, shown in Fig. 9, as described above. These coacting members 35 and 37 at each side of the tractor cover are adapted to support a flexible or fabric side wing on the cover, generally as indicated at 7 in Fig. 1, the canvas or other material being secured on these members 35 and 37 and carried thereby. The arm 37 is adapted to swing toward the member 35 for collapsing the side wing.

At the upper end of the arm 37, is pivotally connected at 39, a side wing bar 40, which extends forwardly from said pivotal connection 39 in overlapping relation with the frame side member 35 at each corresponding side of the tractor cover. The side wing bar 40 passes through a loop 41 secured, as by welding, to the upper end portion of the side frame member 35 and providing a slidable connection therewith. The bar 40 has a notch 42 in the lower edge thereof in position to receive the loop 41, when the arm 37 of the cover side wing is in its fully extended rearward position, so as to lock the parts 35 and 37 in laterally spaced relation, substantially as shown in Fig. 11. Since the bar 40 is pivoted at 39, it may be lifted relative to the supporting side member 35 to release the notch 42 from sliding movement of the bar 40 relative to the support member 35 for collapsing of the side wing.

At its forward end, the wing bar 40 has a clip member 43 pivotally connected therewith by a bolt or rivet, as desired, as indicated at 44, the bolt 44 extending through the clip member 43 and through the forward end portion of the side wing bar 40, as well as through the windshield wing frame member 49.

The clip member 43 has a socket 43' adapted to receive a projecting prong 45 on the lower end of the end member of a windshield frame 46. This frame may be formed of wires welded together and with projecting prongs at opposite ends thereof, or of other suitable frame material. The frame 46 normally receives a canvas covering portion, which in turn carries a plastic windshield, generally as indicated at 47, and which corresponds substantially with that described above, as shown at 15.

The upper portion of the windshield frame is held in place by a clip 48, formed in a loop embracing the windshield frame 46 and extending therefrom to a wing frame member 49, to which said clip 48 is connected as by a nut and bolt 56. A slug 48' welded on the windshield frame 46 keeps the frame from sliding upward out of the socket 43'.

The windshield wing is designated generally at 51, corresponding substantially with that designated at 16 in Fig. 1, and is carried by a wing frame 52, of suitable form and material, and which is shown as secured to the wing frame member 49.

The wing frame 52 is provided with a detachable clip structure including a member 53 which carries a headed pin 54 on the inner side thereof that extends inwardly through an enlarged hole in the wing bar 49, and projecting inwardly from the bar 40 sufficiently to be engaged by a notched end of a latch 55, pivotally mounted at 39, so as to swing upward away from the pin 54 and allow the latter to be withdrawn from the hole in the bar 40, or when the latch is turned downward to the position shown in Fig. 11, it will hold it securely to the bar 40, thereby anchoring the windshield wing 51 in place.

It will be apparent from Fig. 11 that the structure is the same at both opposite sides of the tractor cover, and only one side has been described in detail for simplicity of illustration.

The windshield 47 is capable of swinging movement to a horizontal position about the axis of the pivotal connections 44 so as to be laid down either back toward the operator, toward the left in Fig. 11, or away from the operator and on top of the fuel tank of the engine, toward the right of Fig. 11. This is quite an advantage when the operator does not need the windshield for protection and desires that it be moved down out of the way.

It is necessary first for him to disconnect the windshield side wings 51 from the frame of the side sections 7 of the tractor cover. This may be accomplished by releasing the catches 55 and disengaging the headed pins 54 from the openings in the wing bars 40.

Then the side portions 7 of the tractor cover should be collapsed by swinging the arms 37 forward toward the frame side members 35, after releasing the notches 42 from the clips 41, which thereby moves the windshield 47 bodily forward since it is carried by the side wing bars 40, and at the same time collapsing the side wings of the cover.

When so released, the windshield wings 51 may be moved relative to the tractor cover frame, swinging outward with respect thereto due to the yieldability of the frame 52, as well as relative to the frame of the windshield 47, permitting the latter to be laid down, either back toward the operator, or forward toward the engine fuel tank, as described above. The windshield 47 may be laid down toward the operator without interference with the steering wheel having been moved clear thereof by the said forward motion.

A further modification is shown in Figs. 12 and 13 in which the windshield plastic material is designated at 60 and is enclosed around its edges by folded-over strips of canvas, or other suitable fabric, generally designated at 61, forming pockets along the respective edges of the windshield and open at opposite ends. Small rods or wires indicated at 62 extend transversely of the windshield with outturned opposite ends 63, and enclosed within the pockets 61 to hold the windshield in proper flat condition. This covering material, so made, may be packed flat and readily assembled on the frame by the user.

A form of frame is shown in Fig. 12, comprising top and bottom bars 64, connected with upright bars 65, all of which are preferably flat and are bolted together at 66. The respective bars 64 and 65 may be inserted by the user through the open ended pockets 61, and then connected together by the bolts 66 which thereby forms a unitary windshield that may be connected with the cover frame, generally as described above.

In the form illustrated, clips 67 are attached at the corners of the frame and may extend therefrom to the bars 49 of the wing frame 51, to which these clips may be connected by bolts or other suitable fastenings.

If a bowed windshield is desired, the frame bars 64 may be permanently bowed lengthwise, which will not interfere with the shipping thereof inasmuch as these bars will be shipped separate and assembled by the user. This simplifies materially the shipping problem and enables the structure to be shipped in collapsed compact form, which has been difficult to obtain heretofore.

It will be evident that the tractor cover may be used and applied to different forms of tractors with suitable cut-outs for receiving lamp brackets, levers, and other control parts. Provision is made not only for full visibility of the area around and in front of the tractor, but also an effective control of the heat is provided through the opening 25 having suitable control means for adjusting the size of the opening and the amount of heat allowed to pass therethrough into the operator's enclosure. In this way the comfort of the operator may be regulated and a more satisfactory result obtained with the enclosure. At the same time other advantages are obtained, some of which have been mentioned.

While the invention has been illustrated in certain embodiments, it is recognized that variations and changes may be made therein without departing from the invention as claimed.

I claim:

1. In a tractor cover, the combination of a supporting frame for covering material including rearwardly extending side sections of said covering material, said frame including a cross bar and upright portions at opposite ends of the cross bar adapted to be mounted on a tractor, upwardly extending frame members pivotally connected at the lower end portions thereof with the upright portions of the frame for swinging movement toward and from said upright portions, said upwardly extending frame members being adapted for connection with the rearwardly extending side sections of covering material and supporting the latter and adapted to be moved forward relative to the upright portions of the frame to collapse said side sections of covering material.

2. In a tractor cover, the combination of a supporting frame including a cross bar and upright portions at opposite ends of the cross bar adapted to be mounted on a tractor, upwardly extending frame members pivotally connected at the lower end portions thereof with the upright portions of the frame for swinging movement toward and from said upright portions, tractor covering material mounted on the supporting frame including a cowl portion connected with the cross bar and side sections extending rearwardly therefrom in positions to extend about the sides of the operator supporting portion of the tractor, said side sections being connected at the rear edges thereof with the pivotally mounted frame members to be extended thereby in one position of said members and to be collapsed upon forward swinging thereof.

3. In a tractor cover, the combination of a supporting frame including a cross bar and upright portions at opposite ends of the cross bar adapted to be mounted on a tractor, upwardly extending frame members pivotally connected at the lower end portions thereof with the upright portions of the frame for swinging movement toward and from said upright portions, tractor covering material mounted on the supporting frame including a cowl portion connected with the cross bar and side sections extending rearwardly therefrom in positions to extend about the sides of the operator supporting portion of the tractor, said side sections being connected at the rear edges thereof with the pivotally mounted frame members to be extended thereby in one position of said members and to be collapsed upon forward swinging thereof, said cowl portion of covering material having an opening therein in position to admit heat to the operator supporting portion of the tractor and extending upwardly from the lower edge of said cowl portion, and adjustable closure means over said opening to regulate the quantity of heat directed therethrough.

4. In a tractor cover, the combination of a supporting frame for covering material having side sections thereon adapted to extend rearwardly relative to the tractor, said supporting frame including a cross bar and rearwardly extending sections at opposite ends of the cross bar and upright portions for mounting said frame on a tractor, a windshield structure extending transversely of the frame, means hingedly connecting the windshield to the supporting frame for swinging movement of said windshield structure from an upright position forwardly to a lowered position relative thereto, side wings at opposite ends of the windshield structure and extending laterally therefrom, means mounting each of the side wings at one end thereof on the windshield structure adapted to extend rearwardly therefrom when the windshield is in said upstanding position, means forming a detachable clip fastening on the opposite end portion of each side wing for detachably engaging the rearwardly extending section of the frame for holding said side wings in said rearwardly extending positions and for detachment therefrom for folding of the windshield structure to said lowered position, and upwardly extending frame members pivotally connected at their lower ends with the upright portions of the supporting frame and connected with the rearwardly extending sections thereof, said upwardly extending frame members being adapted for connection with the rearwardly extending side sections of covering material to hold said flaps in place and permitting collapsing of said rearwardly extending side flaps upon swinging movement of said upwardly extending frame members.

5. In a tractor cover, the combination of a supporting frame for covering material adapted to extend about the sides of an operator supporting portion, said supporting frame including a cross bar portion having substantially rearwardly directed frame portions at opposite ends of the cross bar portion, a windshield including a surrounding frame and covering material mounted on said surrounding frame, said windshield extending lengthwise of the cross bar portion, side wings at opposite ends of the windshield and extending rearwardly therefrom, each of the side wings including a surrounding frame having covering material thereon, means hingedly connecting the windshield at the lower edge thereof with at least one of said frame portions and with the forward edge of each side wing to swing about a substantially horizontal axis adjacent said lower edge thereof from an upright position laterally to a lowered position, and clip fastening members carried by each side wing frame adjacent the rearward edge thereof detachably engaging the adjacent rearwardly directed frame portion for holding said wings in place relative thereto.

6. In a tractor cover, the combination of a supporting frame including a cross bar portion having substantially rearwardly directed frame portions at opposite ends of the cross bar portion, tractor covering material mounted on the supporting frame including a cowl portion connected with the cross bar frame portion and side sections connected with the rearwardly directed frame portions in positions to extend about the sides of an operator supporting portion of the tractor, a windshield including a surrounding frame and covering material mounted on a surrounding frame, said windshield extending lengthwise of the cross bar portion, side wings at opposite ends of the windshield and extending rearwardly therefrom, each of the side wings including a surrounding frame having covering material thereon, means hingedly connecting the windshield at the lower edge thereof with at least one of said frame portions and with the forward edge of each side wing to swing about a substantially horizontal axis adjacent said lower edge thereof from an upright position forward to a lowered position, and clip fastening members carried by each side wing frame adjacent the rearward edge thereof detachably engaging the adjacent rearwardly directed frame portion for holding said wings in place relative thereto.

7. In a tractor cover, the combination of a supporting frame for covering material adapted to extend about the sides of an operator supporting portion, said supporting frame including a cross bar portion having substantially rearwardly directed frame portions at opposite ends of the cross bar portion, and upright portions supporting said cross bar and rearwardly directed portions thereon and adapted to be mounted on a tractor, a windshield including a surrounding frame and covering material mounted on said surrounding frame, said windshield extending lengthwise of the cross bar portion, side wings at opposite ends of the windshield and extending rearwardly therefrom, each of the side wings including a surrounding frame having covering material thereon, means hingedly connecting the windshield at the lower edge thereof with at least one of said frame portions and with the forward edge of each side wing to swing about a substantially horizontal axis adjacent said lower edge thereof from an upright position forward to a lowered position, clip fastening means connecting each side wing frame adjacent the upper edge thereof directly with the windshield frame, and clip fastening members carried by each side wing frame adjacent the rearward edge thereof detachably engaging the adjacent rearwardly directed frame portion for holding said wings in place relative thereto.

8. In a tractor cover, the combination of a supporting frame for covering material adapted to extend about the sides of an operator supporting portion, said supporting frame including a longitudinally curved crossbow, upright members connected with the crossbow to support the latter on the tractor at opposite sides of said operator supporting portion, side wing bars extending rearwardly from the crossbow adjacent opposite ends thereof, means mounting said side wing bars on the upright members for bodily forward and rearward movement relative thereto, a windshield extending longitudinally of the crossbow and curved substantially parallel therewith, and means hingedly connecting the opposite ends of the windshield at the lower edge thereof with said side wing bars for swinging movement about a substantially horizontal axis from an upright position to a lowered position, said axis being movable outwardly from the curved crossbow by outward movement of the side wing members providing clearance between the lower edge of the windshield and the crossbow for said lowering movement.

References Cited in the file of this patent

UNITED STATES PATENTS

| | | |
|---|---|---|
| 1,369,741 | Gingle | Feb. 22, 1921 |
| 1,988,975 | Weiland | Jan. 22, 1935 |
| 2,256,890 | Brown et al. | Sept. 23, 1941 |
| 2,423,748 | Acheson | July 8, 1947 |
| 2,452,834 | Clapper | Nov. 2, 1948 |
| 2,461,974 | Flora | Feb. 15, 1949 |
| 2,584,329 | Clapper | Feb. 5, 1952 |

FOREIGN PATENTS

| | | |
|---|---|---|
| 965,432 | France | Sept. 12, 1950 |

OTHER REFERENCES

Tractor Cabs, Montgomery Ward Catalog Fall and Winter 1948.